United States Patent
Payne et al.

(10) Patent No.: US 9,749,825 B2
(45) Date of Patent: Aug. 29, 2017

(54) CONNECTION-ORIENTED MESSAGING AND SIGNALING IN MOBILE HEATH NETWORKS

(71) Applicant: Voalte, Inc., Sarasota, FL (US)

(72) Inventors: Britton Edward Payne, Sarasota, FL (US); Mihnea Gabriel Jiva, Sarasota, FL (US); Donnie C. Fletcher, Sarasota, FL (US)

(73) Assignee: Voalte, Inc., Sarasota, FL (US)

( * ) Notice: Subject to any disclaimer, the term of this patent is extended or adjusted under 35 U.S.C. 154(b) by 0 days.

(21) Appl. No.: 14/735,241

(22) Filed: Jun. 10, 2015

(65) Prior Publication Data

US 2016/0366571 A1    Dec. 15, 2016

(51) Int. Cl.
*H04W 4/00* (2009.01)
*H04W 4/20* (2009.01)
*H04W 76/02* (2009.01)

(52) U.S. Cl.
CPC .......... *H04W 4/20* (2013.01); *H04W 76/028* (2013.01)

(58) Field of Classification Search
CPC ........ H04W 4/20; H04W 76/028; H04W 4/00
USPC .......................................... 455/466; 370/338
See application file for complete search history.

(56) References Cited

U.S. PATENT DOCUMENTS

| | | | |
|---|---|---|---|
| 2006/0039283 A1* | 2/2006 | Sturrock | H04L 41/0896 370/235 |
| 2007/0211703 A1* | 9/2007 | Gu | H04L 12/1818 370/356 |
| 2014/0032682 A1* | 1/2014 | Prado | H04L 51/34 709/206 |
| 2015/0006666 A1* | 1/2015 | Backholm | H04W 4/18 709/213 |
| 2015/0181618 A1* | 6/2015 | Yang | H04W 72/1284 370/329 |

* cited by examiner

*Primary Examiner* — Marcos Batista
(74) *Attorney, Agent, or Firm* — Long Technology Law, LLC; Joseph L. Long

(57) ABSTRACT

Systems and methods can support connection-oriented messaging and signaling. Connection-oriented messaging channels may be established between wireless mobile computing devices within a local-area wireless network. Timeouts, acknowledgements, and other events within the connection-oriented messaging channel may be monitored. Connectivity disruptions may be rapidly identified in response to failures within the connection-oriented messaging channel. Reconnection permits may be issued to control reconnection attempts during connectivity disruptions. The messaging connection manager can buffer undelivered messages during the connectivity disruptions for retransmission of the undelivered messages upon reestablishing connectivity. The messaging connection manager can support messages for setting up, tearing down, and managing streaming communications, such as voice calls, between the wireless mobile computing devices.

20 Claims, 5 Drawing Sheets

CONNECTION-ORIENTED MESSAGING AND SIGNALING IN MOBILE HEATH NETWORKS

BACKGROUND

Mobile devices generally operate on lossy wireless networks (such as Wi-Fi) where packets may be dropped or may arrive out of sequence. There are various challenges for mobile devices to maintain meaningful data connections while operating in these lossy wireless networks. Even simple messaging and signaling can become complicated when a couple of lost packets results in a significant loss of meaning within a message exchange. Similarly, voice or video connections may suffer signal dropouts or even become disrupted to the point of requiring manual reconnection of the call.

There is a need in the art for a mobile messaging system supporting managed connections between mobile devices, rapidly identified connection losses, and resource efficient automatic reconnects. There is a further need in the art for such mobile messaging system to operate on any underlying network protocol while supporting alarms, alerts, messages, notifications, and signaling for out-of-channel streaming serialized data such as voice or video.

SUMMARY

In certain example embodiments described herein, methods and systems can support connection-oriented messaging and signaling. Connection-oriented messaging channels may be established between wireless mobile computing devices within a local-area wireless network. A messaging connection manager can monitor timeouts, acknowledgements, and other events within the connection-oriented messaging channel. The messaging connection manager can rapidly identify connectivity disruptions in response to failures within the connection-oriented messaging channel. The messaging connection manager can issue permits to limit reconnection attempts during the connectivity disruptions in order to conserve resources. The messaging connection manager can track undelivered messages during the connectivity disruptions for retransmission of the undelivered messages upon reestablishing connectivity. The messaging connection manager can support messages for setting up, tearing down, and managing streaming communications, such as voice calls, between the wireless mobile computing devices.

These and other aspects, objects, features, and advantages of the example embodiments will become apparent to those having ordinary skill in the art upon consideration of the following detailed description of illustrated example embodiments.

DETAILED DESCRIPTION OF EXAMPLE EMBODIMENTS

Overview

The methods and systems described herein can enable connection-oriented communication messaging and signaling for mobile user devices operating in lossy wireless network environments. Connection loss may be rapidly detected to initiate reconnection based upon the issuance of controlled reconnection permits. These limited reconnection permits may substantially conserve system resources during connection recovery and maintain a system level awareness of reconnection status. Peer-to-peer connection signaling, setup, and management for streaming or serialized data may be supported. These streaming connections (for services such as voice or video) may be established through out-of-channel set-up signaling using the messaging mechanisms presented herein. The signaling messages may be used to initiate streaming connections as two or more outbound client data connections associated with a peer-to-peer connection manager.

Temporary loss of network connectivity by user devices may be mitigated, in part, by buffering messages for retransmission upon restoration of network connectivity. Granting controlled permits for attempting reconnection to network peer devices may support resource efficient reconnection of disconnected user devices.

The functionality of the various example embodiments will be explained in more detail in the following description, read in conjunction with the figures illustrating the program flow. Turning now to the drawings, in which like numerals indicate like (but not necessarily identical) elements throughout the figures, example embodiments are described in detail.

Example System Architectures

Figure 1:
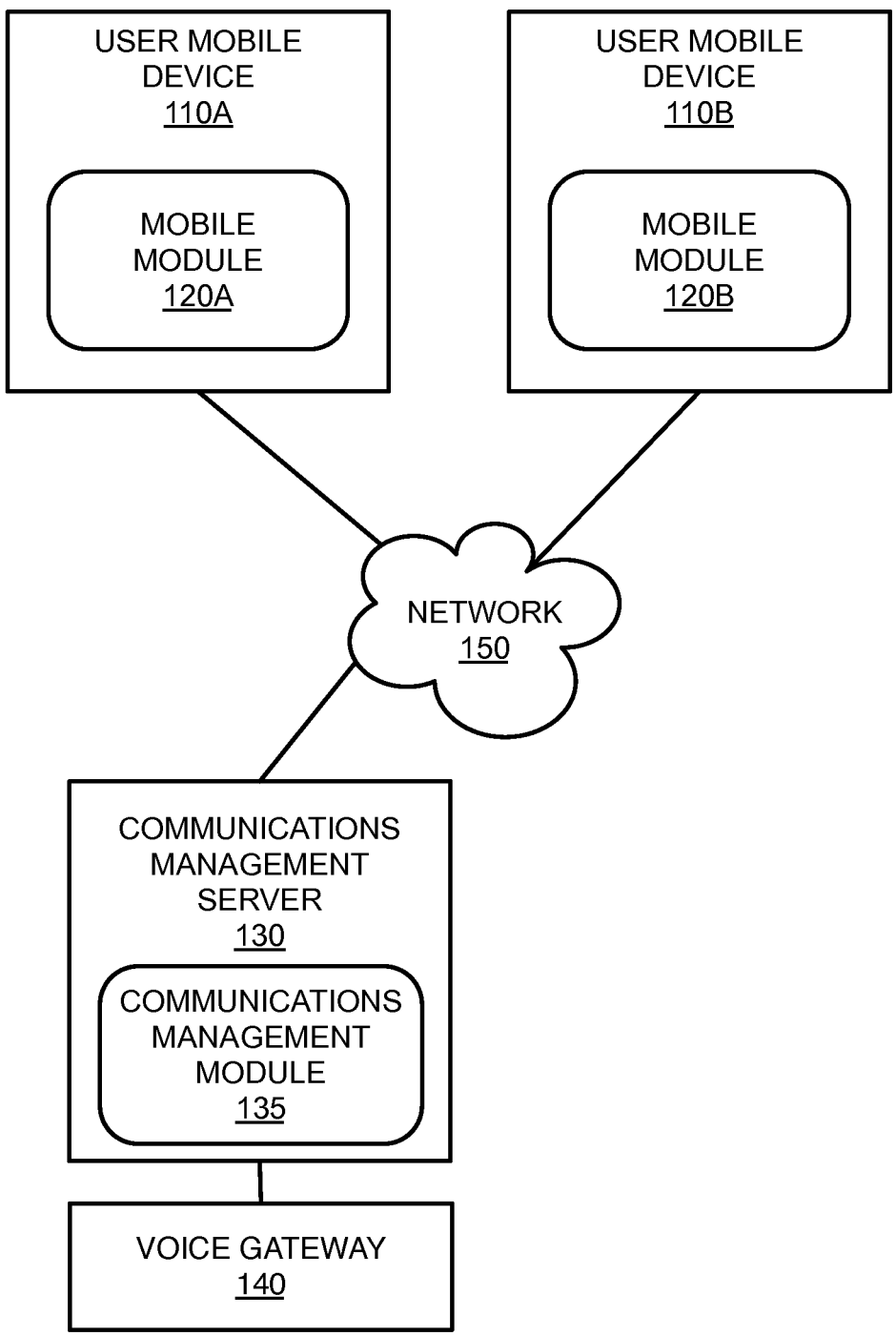
FIG. 1 is a block diagram illustrating a communications system supporting connection-oriented messaging in accordance with one or more embodiments presented herein.

FIG. 1 is a block diagram illustrating a communications system supporting connection-oriented messaging in accordance with one or more embodiments presented herein. A user mobile device 110A and user mobile device 110B, referred to generally and collectively as user mobile devices 110, may execute functionality from mobile module 120A or mobile module 120B respectively. Mobile module 120A or mobile module 120B may be referred to generally and collectively as mobile modules 120. A communications management server 130 may execute functionality from a communications management module 135. A voice gateway 140 may be associated with the communications management server 135. The voice gateway 140 may support voice communications. User mobile devices 110 and the communications management server 130 may communicate via a network 150.

The user mobile device 110 may be any mobile computing device operable to communicate and present messages, alarms, voice, video, or so forth to a user within a healthcare enterprise. The user may be a nurse, physician, technician, or other clinical provider. It should be appreciated that the user may be any individual or group engaging in such communication modalities with one or more other users in various environments, associated with healthcare and otherwise. The user mobile device 110 may comprise any two devices communicating on the network 150. It should be appreciated that two communicating devices is merely one example and, in practice, any number of user mobile devices may be in communication on the network 150. One or more modules, such as the mobile modules 120 may be associated with the user mobile devices 110 to implement the technology presented herein.

It should be appreciated that according to certain embodiments, the functionality associated with the user mobile device 110 may be available at a desktop computer or other computing device. For example, within a healthcare enterprise, a desktop computer or workstation at a nurse call station may communicate with one or more user mobile devices 110 and/or the communications management server 130 according to technology presented herein.

The communications management server 130 can manage various communications modalities within the healthcare environment. These may include alarms, messages, alerts, voice, video, and any other modalities as well as any embodiments of the connection based messaging technology disclosed herein. The communications management server 130 may interface with the voice gateway 140 to provide voice connectivity to VoIP, PBX, POTS, or other telephony services.

The network 150 may generally be any data network. According to one or more embodiments, the network 150 can be a wireless local area network such as Wi-Fi. According to other embodiments, one or more of the user mobile devices 110 or the communications management server 130 may communicate with the network 150 via a wired network interface. The user mobile devices 110 may interface with the network 150 with respect to one or more wireless access points.

Figure 5:
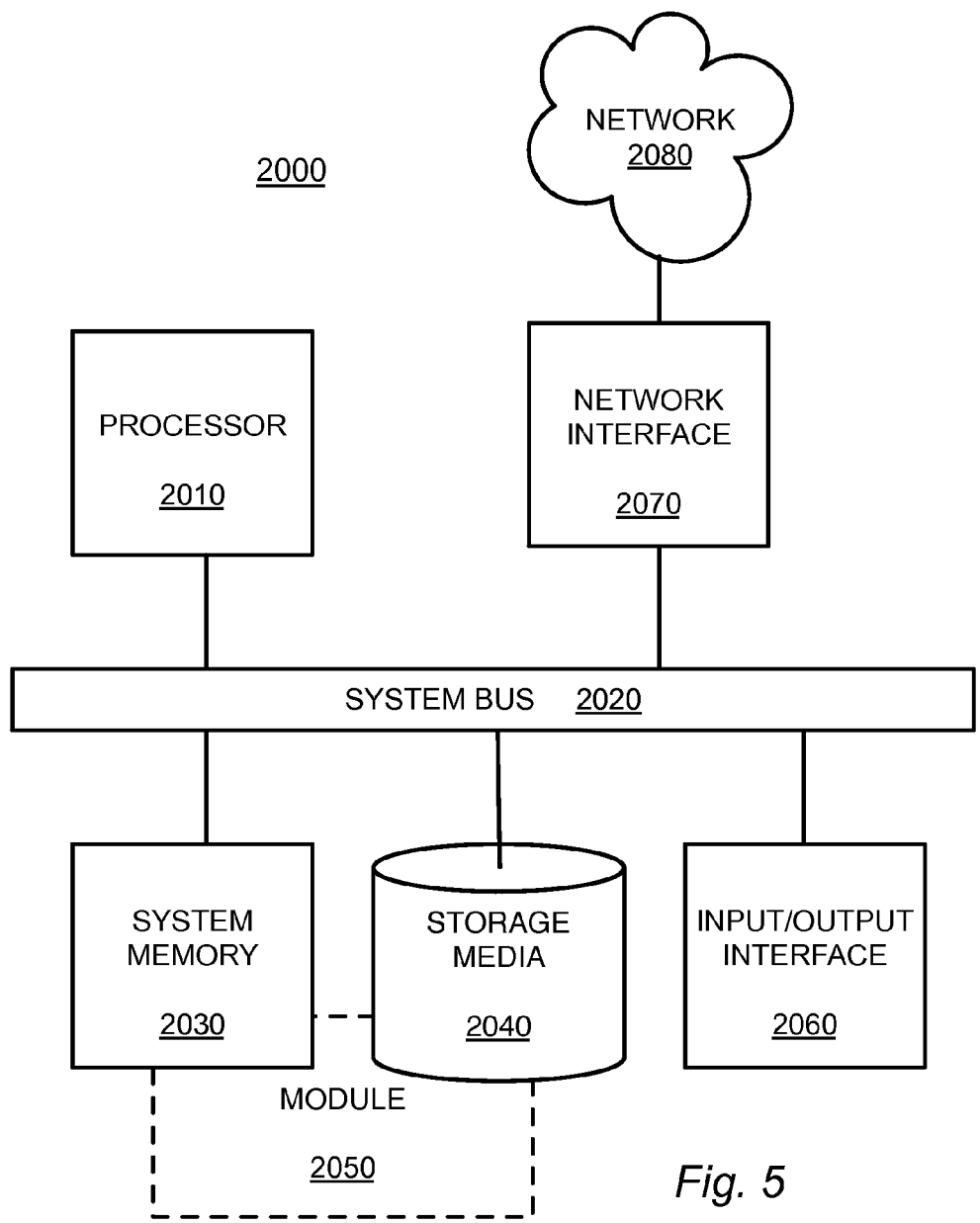
FIG. 5 is a block diagram depicting a computing machine and a module in accordance with one or more embodiments presented herein.

The user mobile device 110, communications management server 130, or any other systems associated with the technology presented herein may be any type of computing machine such as, but not limited to, those discussed in more detail with respect to FIG. 5. Furthermore, any modules (such as the mobile modules 120 or the communications management module 135) associated with any of these computing machines or any other modules (scripts, web content, software, firmware, or hardware) associated with the technology presented herein may by any of the modules discussed in more detail with respect to FIG. 5. The computing machines discussed herein may communicate with one another as well as other computer machines or communication systems over one or more networks such as network 150. The network 150 may include any type of data or communications network including any of the network technology discussed with respect to FIG. 5.

Figure 2:
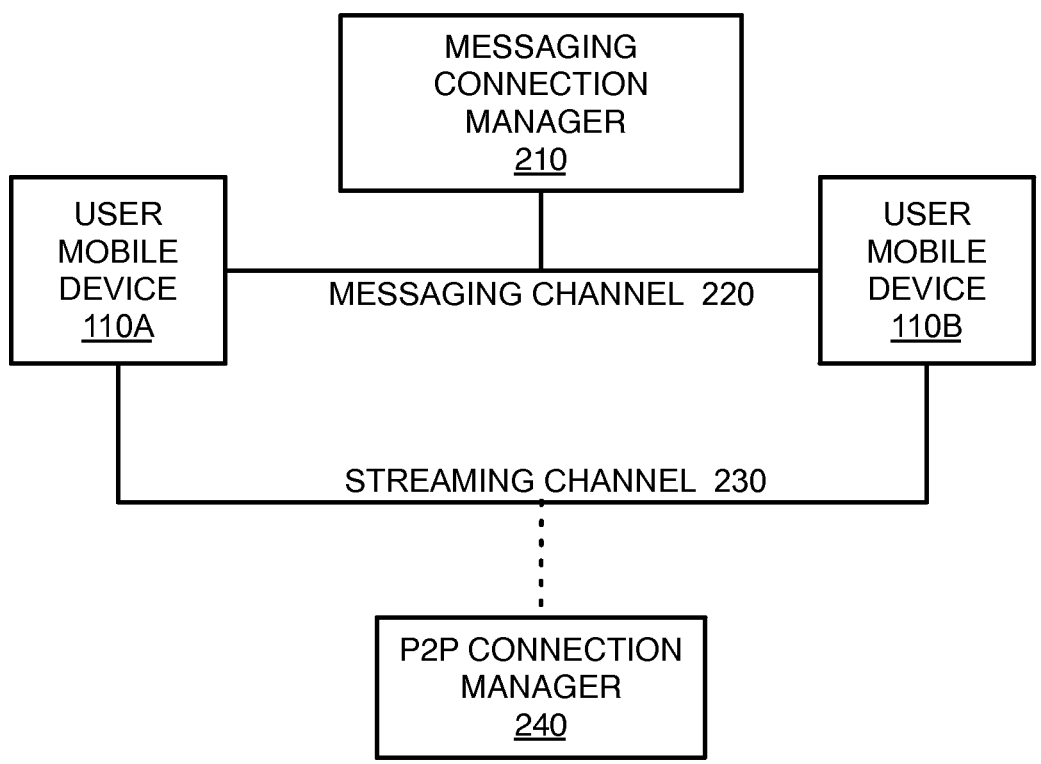
FIG. 2 is a block diagram illustrating a communications network supporting a messaging system for signaling and control of streaming channels in accordance with one or more embodiments presented herein.

FIG. 2 is a block diagram illustrating a communications network supporting a messaging system for signaling and control of streaming channels in accordance with one or more embodiments presented herein. The messaging connection manager 210 can monitor and regulate a messaging channel 220. The messaging channel 220 can support a messaging mechanism associated with two or more user mobile devices 110. One or more streaming channels 230 can support serialized or streaming connections of user mobile devices 110. Connections associated with the streaming channels 230 may be supported by a peer-to-peer (P2P) connection manager 240. The streaming channels 230 may be used for streaming voice, video, or other serialized data. Both the messaging channels 220 and the streaming channels 230 may operate with data-links associated with the network 150. The messaging connection manager 210 and the associated connection-oriented messaging mechanism may operate within, or in association with, the communications management module 135 of the communications management server 130. The messaging connection manager 210 and the associated connection-oriented messaging mechanism may also operate within, or in association with, the user mobiles devices 110 and the associated mobile modules 120.

The messaging connection manager 210 can support connection-oriented messaging between two or more user mobile devices 110 or other nodes of a messaging network. This connection-oriented messaging can provide quality of service improvements that include, among others, rapid identification of connection loss, managed reconnection, and retransmission of messages upon reconnection. The messaging connection manager 210 can monitor and maintain connection status of the user mobile devices 110 via the messaging channel 220. The connection-oriented messaging mechanism supported by the messaging connection manager 210 may operate in conjunction with any network technology, protocols, or architectures. According to one or more embodiments, the connection-oriented messaging mechanism may execute within an application layer above the various networking layers associated with the underlying data network technology of the network 150.

It should be appreciated that the messaging channel 220 can support communications between one or more user mobile devices 110, and the messaging channel 220 may also support communications between the communications management server 130 and any one (or more) of the user mobile devices 110. According to certain embodiments, the user mobile devices 110 may establish messaging channel 220 connections to the communications management server 130. The user mobile devices 110 may then processes messages associated with the messaging channel 220 through the communications management server 130. According to certain embodiments, certain messages, such as directory requests, alarms, or logins may be made specifically between a user mobile device 110 and the communications management server 130. It should be appreciated that all discussions presented herein regarding technology associated with the messaging channel 220 may apply to messages between two or more user mobile devices 110 directly, messages communicated through the communications management server 130 (possibly between two or more user mobile devices 110), or messages communicated between one or more user mobile devices 110 and the communications management server 130. Furthermore, it should be appreciated that the connection-oriented communication messaging and signaling technology may be applied to communications between various combinations of network participants with out departing from the spirit or scope of the technology presented herein.

The connection-oriented messaging mechanism supported by the messaging connection manager 210 can provide acknowledged and ordered message delivery between two or more user mobile devices 110 or other nodes of the messaging network. The messaging connection manager 210 can mitigate packet loss and out-of-order delivery associated with unreliable network technologies such as those operating in an indoor wireless environment. Messages associated with the connection-oriented messaging mechanism may comprise predefined structure. This structure may provide a unique message address, a collection of flags, and so forth.

The messaging connection manager 210 can monitor the messaging channel 220 for connectivity failures associated with individual user mobile devices. Connection failures may be rapidly identified by acknowledgement timeouts in the connection-oriented messaging mechanism. Rapid identification of connection failures may also be provided by periodic, or quasi-periodic, heartbeat messages transmitted between participant nodes using the messaging channel 220.

Messages associated with the messaging channel 220 may include a message type field identifying the message as a synchronize, acknowledgment, push, or close message. Each message can include a sender connection identifier specifying a connection on the sending user mobile device 110. Similarly, each message can include a receiver connection identifier field to identify a specified connection on the receiving user mobile device 110. Each message can include a sequence number field, which indicates the message's sequence number for of the data sequence within a connection. Each message can include an acknowledgment number field indicating the last in-order message number received on the connection. A message can include a timestamp indicating the time a send message was requested. According to some embodiments, the timestamp may be a millisecond-precision unix timestamp, or any other time representation. Each message can include an application data block for transmitting message data from one device on the messaging network to another, for example from one user mobile device 110 to another user mobile device 110.

Each user mobile device 110 (or other messaging channel endpoint) can maintain a unique connection identifier for each connection it is involved in. The identifiers may be locally unique or globally unique. Connection identifiers may be exchanged between user mobile devices 110 (or other network nodes) when a connection is established. The identifiers may persist for the lifetime of the connection. Identifier zero may be reserved for use as a connection identifier during connection establishment.

The messaging mechanism may leverage sequence numbers and acknowledgment numbers in maintaining messaging connections. Each user mobile device 110 in a connection may associate a sequence number with each block of application data sent to another user mobile device 110. Sequence numbers may follow the rules of serial number arithmetic. An initial sequence number may be randomly chosen from within the sequence number space. The sequence number may then be incremented by one for each block of application data transmitted. When a sequence number reaches a maximum value in the allocated space, the next increment may reset the sequence number to zero, similar to unsigned integer arithmetic overflow behavior.

When a connection using the connection-oriented messaging mechanism is established, each user mobile device 110 (or other messaging channel endpoint) may provide an initial sequence number to one another. Each message may contain the sequence number of the last block of application data transmitted. The messages may also contain an acknowledgment number indicating the last ordered sequence number received from the connected user mobile device 110. Acknowledgement of messages arriving out of order may be withheld until intermediate messages have been received. Similarly, the acknowledgment numbers received from a connected user mobile device 110 may be considered received at that device in order.

After a connection is established, blocks of application data may be exchanged. Each block of application data sent may contain the next sequence number. The block may be considered acknowledged when a message is received from the connected mobile user device 110 containing an acknowledgment number greater than or equal to the sequence number of that message.

A connection can be closed in two ways. Firstly, one mobile user device 110 can send a finish or terminate message to the other. Secondly, the messaging connection manager 210 can detect a failure. The failure may be detected directly from the transport or indirectly in response to a timeout condition. When a connection is closed, the messaging connection manager 210 can provide a notification to the sender along with an indication of application data that was not yet acknowledged by the intended receiver.

The connection-oriented messaging mechanism can leverage various timeouts including a send timeout, a receive timeout, and a transport timeout. The send timeout can indicate the amount of time that may elapse before an acknowledgment can be sent to a connected peer. The send timeout can ensure that an acknowledgment is sent in a timely manner. The receive timeout can indicate the amount of time that may elapse before an acknowledgment should have been received from a connection peer. The receive timeout may be approximately double the value of send timeout. Generally, a connection may be considered broken if a receive timeout occurs. A transport timeout indicates the amount of time that can be spent attempting to send a message to the transport. Generally, a connection may be considered broken if a transport timeout occurs.

The connection-oriented messaging mechanism can leverage counters, such as a send counter and a receive counter. The send counter can indicate the number of ordered application data messages received since the last acknowledgment sent. When the send counter reaches or exceeds a predetermined maximum, an acknowledgment may generally be sent to the connected peer and the counter may be reset. Similar to the send timeout, the send counter supports timely transmission of acknowledgments. The receive counter can indicate the number of application data messages sent since the last acknowledgment was received. When this counter reaches a predetermined maximum, the connection may generally be considered broken. The predetermined maximum associated with the receive counter can have an upper bound based on size of the sequence numbers used.

A connection may be considered broken for various reasons. These reasons may include a receive timeout event, a receive counter reaching its maximum allowed value, a transport timeout occurrence, or a transport return error. When a broken connection is detected, the messaging connection manager 210 may alert the sending user mobile device 110 of the failure. The messaging connection manager 210 may also provide the sending user mobile device 110 with an indicator of any application data that has not been successfully acknowledged. Also, the messaging connection manager 210 may close the connection.

The messaging channel 220 can support connection-oriented messaging associated with one or more user mobile devices 110. The messages can support sharing of alarms, notifications, textual messages, and may support establishing streaming serialized connections for services such as voice and video communications. According to one or more embodiments, the messaging channel 220 may comprise a lossy wireless or radio frequency channel. For example, the messaging channel 220 may operate over a wireless local area network, such as a Wi-Fi network.

The connection identifiers, connection sequence numbers, acknowledgements, timeout mechanisms, and other features within the connection-oriented messaging mechanism may support connection-oriented functionality of the messaging channel 220. This connection-oriented functionality may be provided even when the underlying network technology is inherently packet-oriented or otherwise connectionless. The connection-oriented messaging mechanisms associated with the messaging channel 220 can provide quality of service improvements including, among others, rapid identification of connection loss, managed reconnection during connection loss, and retransmission of messages upon reconnection. These quality-of-service improvements may be specifically provided by the connection-oriented messaging mechanisms despite potentially less stringent characteristics of the underlying network protocols and architectures. Accordingly, the quality of service characteristics associated with the specific connection-oriented messaging functions of communicating alarms, textual messages, and establishing streaming serialized connections may be achieved without dependence upon limitations in the underlying network.

It should be appreciated that the connection-oriented messaging mechanisms associated with the messaging channel 220 may operate separately, and dependently upon, the traditional networking protocols. According to the Open Systems Interconnection (OSI) model, the connection-oriented messaging channel can operate within an application logical layer making use of lower transport, network, and physical logical layers. The OSI conceptual model represents a standard for the internal functions of a data communication system. The model represents the networking system as an abstraction of seven logical layers. Each layer serves the layer above it and is served by the layer below it. The lowest layer, layer one, is the physical layer. Layer two is the data link layer. Layer three is the network layer. Layer four is the transport layer. Layer five is the session layer. Layer six is the presentation layer. Finally, the highest layer, layer seven, is the application layer. The connection-oriented messaging mechanisms presented herein may operate within layer seven, the application layer, separately from the lower networking layers. Furthermore, the connection-oriented messaging mechanisms presented herein may depend upon the separate networking layers beneath the application layer.

Streaming channels 230 may be established between user mobile devices 110 and in association with the P2P connection manager 240 to support transmission of streaming, serialized content such as voice or video communications. While setup of the streaming channels 230 may be negotiated and established through message exchange over the messaging channel 220, the streaming content may be transported over one or more links of streaming channels 230 in association with the P2P connection manager 240.

The P2P connection manager 240 can support peer-to-peer streaming of serialized content between two or more user mobile devices 110 or other nodes of the network 150. The peer-to-peer connection associated with the P2P connection manager 240 can support voice calls, videoconferences, or other streaming, serialized delivery services. A caller user mobile device 110A may setup a streaming connection to a recipient user mobile device 110B by signaling the recipient user mobile device 110B over the messaging channel 220. In response, both the caller user mobile device 110A and the recipient user mobile device 110B may establish outbound connections over the streaming channels 230 associated with the P2P connection manager 240. Multi-user conferences may be established over the streaming channels 230 in a similar fashion.

Streaming serialized delivery services associated with the P2P connection manager 240 may be established using the messaging channels 220. Fault tolerance and reliability of messages communicated upon the messaging channel 220 may be considerably higher than for the streaming channel 230 since the messages may benefit from the connection-oriented messaging mechanisms described herein.

The rapid identification of connection loss using the connection-oriented messaging mechanism may correspond to a connection loss in streaming channels 230 associated with the respective user mobile device 110. The message connection manager 210 can maintain a control channel for monitoring timeouts and other indications of changes to the connectivity of either user mobile device 110. For example, in a scenario where a user mobile device 110 has established a streaming connection over a streaming channel 230 (such as a voice call), the connection may be lost when the user mobile device 110 moves into an elevator. Detection of connection loss within the messaging channel 220 can indicate to the associated user mobile devices 110 and/or the messaging connection manager 210 that connection has also been lost with respect to the streaming channel 230.

An improved user experience may be provided for streaming connections over the streaming channel 230 when associated with, or when established by, the messaging channel 220. Rapid identification of connection failure inherent in the connection-oriented messaging mechanism, can improve handing of connection loss for voice, video, or other connections associated with the streaming channel 230.

For many potential services using streaming channel 230 such as voice calls and videoconferences, the quality of service can be measured by the frequency and duration of interruptions to the service. Rapidly detecting an interruption to a voice call or videoconference can support immediate reconnection attempts. When reconnection occurs quickly enough, what may have been a noticeable break in service can be mitigated. In certain most advantageous cases, faults may be mitigated to the extent of being unperceivable, or barely perceivable, interruptions in communication. In instances where faults or delays are long enough to be perceived, a threshold may be established for notify the users of the situation.

When a service interruption extends longer than the specified threshold, the user mobile devices 110 can indicate something to the effect of a hold message or notification tone to the users. The indicator may be provided by an audio message, a text message, text presented on the video display, or other notification provided to the user at the user mobile device 110. Providing the hold indicator can enhance the user experience by protecting the user from the frustration of unknowingly continuing to talk over a dead line. While the hold indicator is being presented to the user, reconnection attempts may be automatically carried out in the background. With rapid reconnection and hold indicators, the technology presented herein can provide a user experience comparable to, or better than, a landline telephone or modern mobile telephone.

Without the rapid connection failure detection provided by the messaging channel 220, discovery of a failure within a streaming service was traditionally a much higher latency process. Such a failure might only be detected by assertion of a connection socket-close flag, some other fail indication propagating up through the network protocol stack, an indication from the operating system (or associated drivers), or perhaps some notification from the P2P connection manager 240. The notifications typically do not provide a rapid, consistent connectivity detection capability, and generally are not invoked until multiple packets have been lost.

According to certain communication examples within a healthcare enterprise, a voice call connection may be initiated from a user mobile device 110. The user mobile device 110 can display a list of contacts including staff roles and departmental contacts. To initiate the voice call, a first user mobile device 110A can transmit a message over the messaging channel 220 to a second user mobile device 110B. The transmitted message may be requesting a voice connection. Once received at the second user mobile device 110B, the request may be indicated to the user of the second user mobile device 110B. The user may experience the request as an option to "answer" the call or not. Upon accepting the request, the second user mobile device 110B may send an accept message over the messaging channel 220 to the first user mobile device 110A. The actual streaming connection of the voice call may now be established by both of the user mobile devices 110A, 110B over the streaming channel 230 in association with the P2P connection manager 240. According to certain embodiments, both of the user mobile devices 110A, 110B may establish their streaming connections as outgoing call requests to the P2P connection manager 240 even though it may appear to the users that the first user mobile device 110A is actually calling to the second user mobile device 110B.

The setup, teardown, and control/management signaling for the voice call may occur other the messaging channel 220 even thought the payload of the call itself is associated with the streaming channel 230. According to certain embodiments, the P2P connection manager 240 may also use the messaging channel 220 to participate in signaling associated with streaming connections. It should be appreciated that the messaging channel 220 and the streaming channel 230 may operate as separate channels using common network resources. The channels may be separated due to their use of different packets or protocols. The common network resources may be associated with wireless local area network technologies such as the network 150. The resources may include frequencies, Wi-Fi channels, access points, antennas, switches, and various other such network infrastructure elements.

Figure 3:
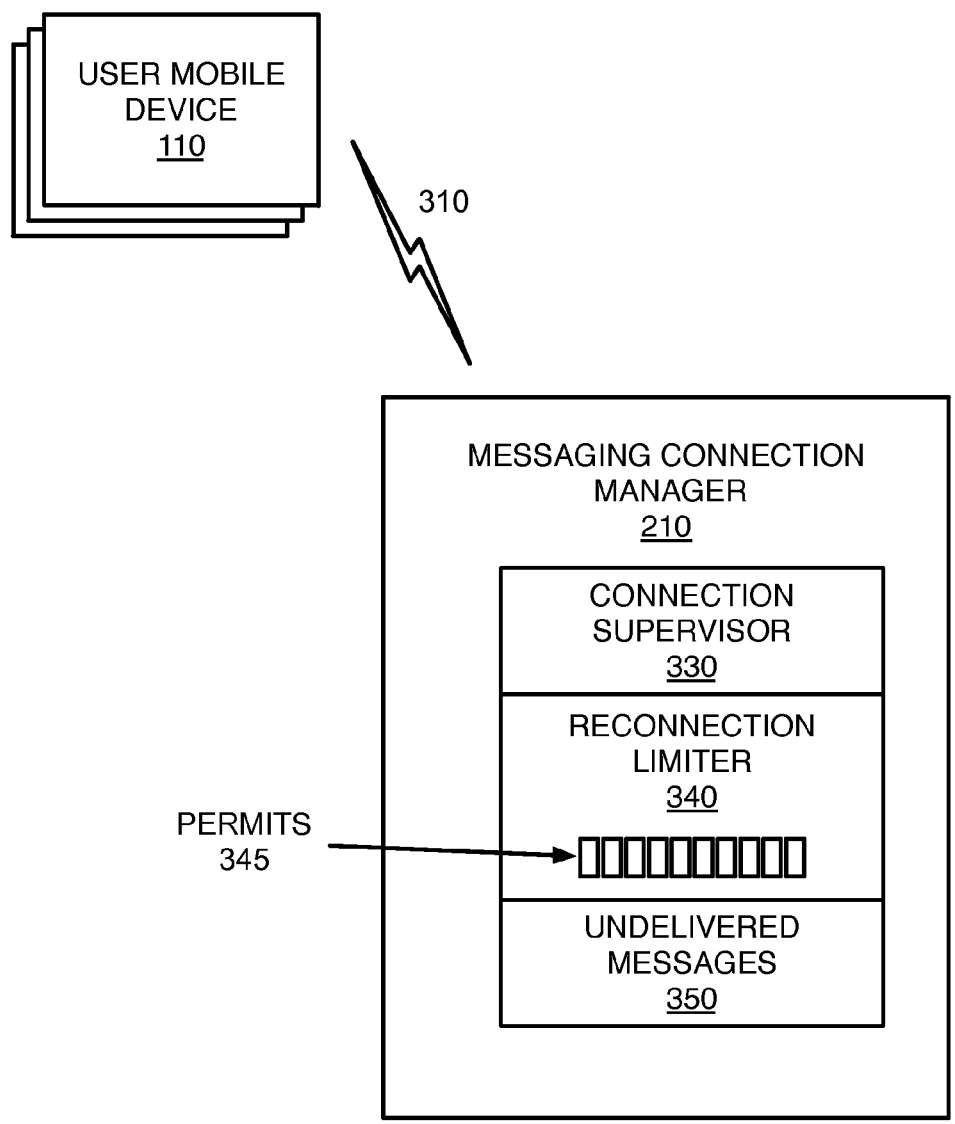
FIG. 3 is a block diagram illustrating aspects of a messaging connection manager in accordance with one or more embodiments presented herein.

FIG. 3 is a block diagram illustrating aspects of a messaging connection manager 210 in accordance with one or more embodiments presented herein. The messaging connection manager 210 can support connection-oriented message passing between two or more user mobile devices 110. The messages may be communicated over one or more wireless network links 310 associated with the network 150. The messaging connection manager 210 can include a connection supervisor 330, a module for handling undelivered messages 350, and a reconnection limiter 340 based upon reconnection permits 345. It should be appreciated that the messaging connection manager 210, or aspects thereof, may operate within the user mobile device 110 (or other messaging channel endpoint).

The connection supervisor 330 can monitor the communication of messages associated with the messaging channel 220. The connection supervisor 330 can rapidly identify broken connections by monitoring acknowledgements and timeout messages being transmitted via the messaging channel 220. The connection supervisor 330 can provide connection state notifications to network participants such as the user mobile devices 110. The participants may register with the connection supervisor 330 to receive connection state notifications. When the connection supervisor 330 identifies a connection failure, the module for handling undelivered messages 350 may operate to collect a record or any undelivered messages 350. When the connection supervisor 330 identifies a connection failure, the reconnection limiter 340 may issue reconnection permits 345 to control reconnection attempts.

The reconnection limiter 340 can control reconnection attempts after a connection failure to conserve resources. When a user mobile device 110 suffers a connection failure, its reconnection mechanism might traditionally attempt to reestablish a failed connection as often as possible until successful. Such highly eager reconnection may seek to minimize the duration of service interruptions. Unfortunately, each instance in which the disconnected user mobile device 110 attempts to reconnect may consume additional resources. Rapid-fire reconnection attempts may consume even more resources. These resources may include the battery of the disconnected user mobile device 110. Better power may be unnecessarily wasted by repeated, rapid-fire transmissions to attempt reconnection. The resources may include network resources. Repeated, rapid-fire transmissions to attempt reconnection may also result in denial of service to other user mobile devices 110. Such network congestion may occur by saturating the effective capacity of the RF channel 310 or by saturating the throughput of hardware and/or software associated with the network 150 or connected systems.

The reconnection limiter 340 can issue permits 345 to the user mobile devices 110. The user mobile devices 110 may be required to hold a permit 345 before attempting to reconnect a broken connection. Accordingly, the permits 345 may be used to control reconnection attempts. The reconnection limiter 340 may limit the number of permits 345 issued within a time window, or it may limit the maximum number of permits 345 issued. Limitations may be imposed per user mobile device 110, in total, or according to some combination thereof. When a maximum number of permits 345 has been used without the connection being reestablished, it may be determined that the reconnection process has failed. Other participating network nodes and resources may be notified of such failure determinations. When a reconnection attempt is successful, the messaging connection manager 210 and the connection supervisor 330 may take note of the change in connection status.

The reconnection limiter 340 can conserve resources such as battery life and network efficiency while affording opportunity for circumstances related to the broken connection to change. For example, if a user enters an elevator with a mobile device 110, the quality of the underlying RF channel 310 might not improve until the elevator door opens again. Rapid-fire attempts by other user mobile devices 110 to connect to the one within the elevator may be fruitless until the elevator door opens and the user mobile device 110 within exits the elevator.

Undelivered messages 350 may be buffered during a loss of connectivity associated with a user mobile device 110. When a connection is broken involving one or more user mobile devices 110, the connection supervisor 330 may be notified of undelivered messages 350 by other user mobile devices 110 that remain connected. The undelivered messages 350 may be retained for future retransmission. Upon successful reconnection, a buffer for undelivered messages 350 may be checked for any undelivered messages 350 that have been stored. These undelivered messages 350 may be retransmitted when the user mobile device 110 successfully reconnects. Following an attempt to retransmit a given undelivered messages 350, the success of the retransmission may be determined by processing the retransmitted message's acknowledgment. Once an acknowledgement of successful retransmission has been received, the successfully delivered messages may be removed from the buffer for undelivered messages 350.

It should be appreciated that some, or all, of the functionally described herein as associated with the messaging connection manager 210 may actually operate within one or more user mobile devices 110 in association with the mobile modules 120.

Example Processes

According to methods and blocks described in the embodiments presented herein, and, in alternative embodiments, certain blocks can be performed in a different order, in parallel with one another, omitted entirely, and/or combined between different example methods, and/or certain additional blocks can be performed, without departing from the scope and spirit of the invention. Accordingly, such alternative embodiments are included in the invention described herein.

Figure 4:
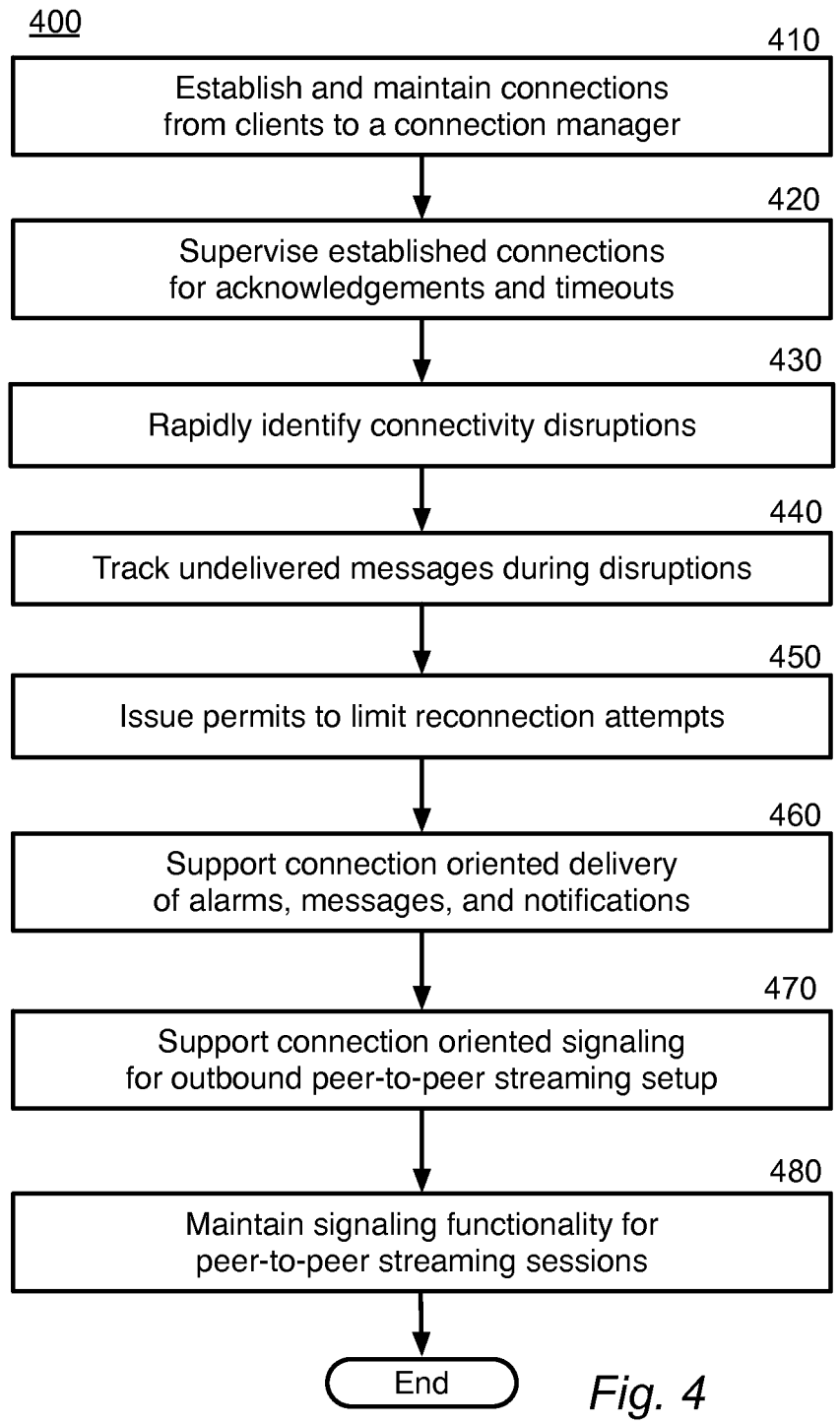
FIG. 4 is a block flow diagram depicting a method for connection-oriented messaging and signaling in accordance with one or more embodiments presented herein.

FIG. 4 is a block flow diagram depicting a method 400 for connection-oriented messaging and signaling in accordance with one or more embodiments presented herein. In block 410, a messaging connection manager 210 can establish and maintain connections with and between clients such as user mobile devices 110. The messaging connection manager 210 can mitigate packet loss and out-of-order delivery associated with unreliable network technologies such as those operating in an indoor wireless environment.

In block 420, the messaging connection manager 210 can supervise established connections for acknowledgements and timeouts. The messaging connection manager 210 can monitor the communication of messages associated with the messaging channel 220. The messaging connection manager 210 can monitor the messaging channel 220 for connectivity failures associated with individual user mobile devices 110.

In block 430, the messaging connection manager 210 can rapidly identify connectivity disruptions. Connection failures may be rapidly identified by acknowledgement timeouts in the connection-oriented messaging mechanism. Rapid identification of connection failures may also be provided by periodic, or quasi-periodic, heartbeat messages transmitted between participant nodes using the messaging channel 220.

In block 440, the messaging connection manager 210 can track undelivered messages 350 during connectivity disruptions. The undelivered messages 350 may be buffered during a loss of connectivity. When a connection is broken involving one or more user mobile devices 110, the connection supervisor 330 may be notified of undelivered messages 350 by other user mobile devices 110 that remain connected. The undelivered messages 350 may be retained for future retransmission. Upon successful reconnection, a buffer for undelivered messages 350 may be checked for any undelivered messages 350 that have been stored. These undelivered messages 350 may be retransmitted when the user mobile device 110 successfully reconnects In block 450, the messaging connection manager 210 can issue permits to limit reconnection attempts. The reconnection limiter 340 can issue permits 345 to the user mobile devices 110. The user mobile devices 110 may be required to hold a permit 345 before attempting to reconnect a broken connection. Accordingly, the permits 345 may be used to control reconnection attempts. The reconnection limiter 340 may limit the number of permits 345 issued within a time window, or it may limit the maximum number of permits 345 issued. Limitations may be imposed per user mobile device 110, in total, or according to some combination thereof.

In block 460, the messaging connection manager 210 can support connection-oriented delivery of alarms, messages, and notifications. The connection-oriented messaging mechanism supported by the messaging connection manager 210 can provide acknowledged and ordered message delivery between two or more user mobile devices 110 or other nodes of the messaging network. The messaging connection manager 210 can mitigate packet loss and out-of-order delivery associated with unreliable network technologies such as those operating in an indoor wireless environment. The messages can support sharing of alarms, textual messages, and may support establishing streaming serialized connections for services such as voice and video communications.

In block 470, a messaging connection manager 210 and can support connection-oriented delivery of outbound peer-to-peer streaming setup associated with a peer-to-peer connection manager 240. Signaling messages transmitted using the messaging channel 220 may be used to initiate streaming connections as two or more outbound client data connections associated with a peer-to-peer connection manager 240.

In block 480, a messaging connection manager 210 can maintain signaling functionality for peer-to-peer streaming sessions associated with the peer-to-peer connection manager 240. Peer-to-peer connection signaling, setup, and management for streaming or serialized data may be supported. These streaming connections (for services such as voice or video) may be established through out-of-channel set-up signaling using the messaging mechanisms presented herein.

Example Systems

FIG. 5 depicts a computing machine 2000 and a module 2050 in accordance with one or more embodiments presented herein. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 also may include volatile memories, such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attachment ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, biometric readers, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks ("WAN"), local area networks ("LAN"), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with a opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

One or more aspects of embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the invention should not be construed as limited to any one set of computer program instructions. Further, a skilled programmer would be able to write such a computer program to implement an embodiment of the disclosed invention based on the appended flow charts and associated description in the application text. Therefore, disclosure of a particular set of program code instructions is not considered necessary for an adequate understanding of how to make and use the invention. Further, those skilled in the art will appreciate that one or more aspects of the invention described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays ("FPGA"), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of embodiments of the invention. Accordingly, such alternative embodiments are included in the inventions described herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of the invention defined in the following claims, the scope of which is to be accorded the broadest interpretation so as to encompass such modifications and equivalent structures.

What is claimed is:

1. A computer-implemented method for connection-oriented messaging and signaling, comprising:
    establishing, directly between a wireless computing device and a second computing device, a connection-oriented messaging channel within a local wireless network;
    monitoring, using a messaging connection manager associated with a third computing device, acknowledgements directly between the wireless computing device and the second computing device within the connection-oriented messaging channel;
    monitoring, using the messaging connection manager, timeouts directly between the wireless computing device and the second computing device within the connection-oriented messaging channel;
    rapidly identifying, using the messaging connection manager, connectivity disruptions in response to failed acknowledgements or failed timeouts within the connection-oriented messaging channel;
    limiting reconnection attempts during the connectivity disruptions to conserve resources;
    tracking, using the messaging connection manager, undelivered messages during the connectivity disruptions for retransmission upon reestablishing connectivity; and
    supporting, using the messaging connection manager, messages for signaling streaming communications.

2. The computer-implemented method of claim 1, wherein connection-oriented comprises acknowledged and ordered message delivery.

3. The computer-implemented method of claim 1, wherein the connection-oriented messaging channel operates in association with an application logical layer making use of lower transport, network, and physical logical layers.

4. The computer-implemented method of claim 1, wherein limiting reconnection attempts comprises issuing reconnection permits.

5. The computer-implemented method of claim 1, wherein messages associated with the connection-oriented messaging channel comprise alarms, text communications, and notifications.

6. The computer-implemented method of claim 1, wherein signaling comprises setup, teardown, and management for the streaming communications.

7. The computer-implemented method of claim 1, wherein signaling comprises establishing streaming communications between two wireless computing devices by initiating outbound connections from each of the wireless computing devices.

8. The computer-implemented method of claim 1, wherein the streaming communications comprise digital representations of voice audio signals.

9. The computer-implemented method of claim 1, wherein the streaming communications comprise peer-to-peer connectivity.

10. The computer-implemented method of claim 1, wherein the local wireless network functions within a healthcare enterprise.

11. A connection-oriented messaging and signaling system, comprising:
one or more processing units, and one or more modules, wherein the connection-oriented messaging and signaling system is configured by the one or more modules to:
establish a connection-oriented messaging channel directly between a wireless computing device and a second computing device within a local wireless network;
monitor, using a messaging connection manager associated with a third computing device, acknowledgements directly between the wireless computing device and the second computing device within the connection-oriented messaging channel;
monitor, using the messaging connection manager, timeouts directly between the wireless computing device and the second computing device within the connection-oriented messaging channel;
rapidly identify, using the messaging connection manager, connectivity disruptions in response to failed acknowledgements or failed timeouts within the connection-oriented messaging channel;
limit, using the messaging connection manager, reconnection attempts during the connectivity disruptions to conserve resources;
track, using the messaging connection manager, undelivered messages during the connectivity disruptions for retransmission upon reestablishing connectivity; and
support messages for signaling streaming communications.

12. The connection-oriented messaging and signaling system of claim 11, wherein the streaming communications comprise digital representations of voice audio signals.

13. The connection-oriented messaging and signaling system of claim 11, wherein the streaming communications comprise peer-to-peer connectivity.

14. The connection-oriented messaging and signaling system of claim 11, wherein signaling comprises establishing streaming communications between two wireless computing devices by initiating outbound connections from each of the wireless computing devices.

15. The connection-oriented messaging and signaling system of claim 11, wherein signaling comprises setup, teardown, and management for the streaming communications.

16. The connection-oriented messaging and signaling system of claim 11, wherein the connection-oriented messaging channel operates in association with an application logical layer making use of lower transport, network, and physical logical layers.

17. The connection-oriented messaging and signaling system of claim 11, wherein limiting reconnection attempts comprises issuing reconnection permits.

18. The connection-oriented messaging and signaling system of claim 11, wherein connection-oriented comprises acknowledged and ordered message delivery.

19. The connection-oriented messaging and signaling system of claim 11, wherein the local wireless network functions within a healthcare enterprise; and messages associated with the connection-oriented messaging channel comprise alarms and notifications associated with operations within the healthcare enterprise.

20. A computer program product, comprising:
a non-transitory computer-readable storage medium having computer-readable program code embodied therein that, when executed by one or more computing devices, perform a method comprising:
establishing a connection-oriented messaging channel within a local-area wireless network, wherein the messaging channel is coordinated by a messaging connection manager;
monitoring, by the messaging connection manager, timers and acknowledgements associated with direct peer-to-peer message delivery within the connection-oriented messaging channel;
rapidly identifying, by the messaging connection manager, connectivity disruptions in response to timer and acknowledgement events within the connection-oriented messaging channel;
issuing reconnection permits, by the messaging connection manager, operable to control direct peer-to-peer reconnection attempts during the connectivity disruptions;
buffering, by the messaging connection manager, undelivered direct peer-to-peer messages during the connectivity disruptions for retransmission upon reestablishing connectivity; and
supporting, by the messaging connection manager, messages for setting up, tearing down, and managing peer-to-peer voice communication over a streaming communications channel separate from the connection-oriented messaging channel.

* * * * *